United States Patent [19]

Matsufuji et al.

[11] Patent Number: 5,064,687
[45] Date of Patent: Nov. 12, 1991

[54] METHOD FOR MAKING MAGNETIC RECORDING MEDIA

[75] Inventors: Akihiro Matsufuji; Kiyomi Ejiri; Mikio Ohno; Masatoshi Kiyama; Kunihiko Honda, all of Kanagawa, Japan

[73] Assignee: Fuji Photo Film Co., Ltd, Kanagawa, Japan

[21] Appl. No.: 668,821

[22] Filed: Mar. 13, 1991

[30] Foreign Application Priority Data

Mar. 13, 1990 [JP] Japan .................................... 2-61518

[51] Int. Cl.$^5$ ............................................. B05D 5/12
[52] U.S. Cl. .................................... 427/132; 427/128
[58] Field of Search ................ 427/128, 132; 428/900, 428/694, 695

Primary Examiner—Bernard Pianalto
Attorney, Agent, or Firm—Sughrue, Mion, Zinn, Macpeak & Seas

[57] ABSTRACT

A method for making a magnetic recording medium comprises the steps of mixing ferromagnetic grains and a surface treating agent, grinding the resulting mixture, and thus obtaining a ground mixture. A binder and a solvent are added to the ground mixture, which results from the mixing and grinding process, the resulting mixture is kneaded and diluted, and a kneaded and diluted mixture is thus obtained. An additive and a solvent are then added to the kneaded and diluted mixture, which results from the kneading and diluting process, a dispersion process is carried out on the resulting mixture, and a dispersion mixture is thereby obtained. Thereafter the dispersion mixture, which results from the dispersion process, is applied to a non-magnetic substrate.

6 Claims, No Drawings

METHOD FOR MAKING MAGNETIC RECORDING MEDIA

BACKGROUND OF THE INVENTION

1. Field of the Invention

This invention relates to a method for making a magnetic recording medium, on which information can be recorded at high densities. This invention particularly relates to a method for making a magnetic recording medium having a magnetic layer containing ferromagnetic grains, wherein surface properties of ferromagnetic grains are modified efficiently.

2. Description of the Prior Art

Nowadays there is a strong demand for magnetic recording media which exhibit magnetic recording characteristics suitable for the recording of information at high densities, for example, high coercive forces (Hc) and high residual magnetic flux densities (Br). As ferromagnetic grains to be contained in magnetic layers of such magnetic recording media, for example, ferromagnetic metal grains are suitable.

However, if the coercive force (Hc) and/or the residual magnetic flux density (Br) of ferromagnetic grains becomes high, the interaction between the ferromagnetic grains will also increase. Therefore, ferromagnetic grains, which exhibit a high coercive force (Hc) and/or a high residual magnetic flux density (Br), cannot easily be dispersed in magnetic coating compositions, which are used to form magnetic layers of magnetic recording media. Also, alloy grains are easily oxidized. Therefore, in cases where alloy grains are employed as the ferromagnetic grains in magnetic layers of magnetic recording media, the magnetic characteristics of the magnetic recording media more easily deteriorate with the passage of time than magnetic recording media, which have magnetic layers containing oxide types of ferromagnetic grains.

In order for better electromagnetic transducing characteristics to be obtained, ferromagnetic grains are used in the form of fine grains in the course of forming magnetic layers of magnetic recording media. Fine ferromagnetic grains have a higher level of interaction with one another than coarse ferromagnetic grains. Therefore, when fine ferromagnetic grains are employed, it becomes more difficult to achieve uniform dispersion of ferromagnetic grains.

In order for the aforesaid problems to be eliminated, it has been proposed to utilize various surface treating agents, such as surface active agents and reactive coupling agents, for the purposes of improving the dispersibility of ferromagnetic grains. Techniques for utilizing various surface active agents are disclosed in, for example, Japanese Unexamined Patent Publication Nos. 52(1977)-156606, 53(1978)-15803, 53(1978)-116114, and 58(1983)-102504. Also, techniques for utilizing various reactive coupling agents are disclosed in, for example, Japanese Unexamined Patent Publication Nos. 49(1974)-59608 and 56(1981)-58135 and Japanese Patent Publication No. 62(1987)-28489.

In the course of making a magnetic recording medium, such that a magnetic coating composition having good dispersing qualities may be obtained quickly, a process for kneading ferromagnetic grains and a small amount of a binder solution together has heretofore been carried out with an incorporating machine exhibiting a high shearing force, such as a kneader, before the ferromagnetic grains are dispersed in the binder solution by use of a dispersing machine, such as a ball mill or a sand grinder. Also, such that large kneading effects may be achieved and a uniform paste may be obtained from the kneading process, dispersing agents and/or stabilizers have heretofore been added to the mixture, which is to be kneaded, or binders have heretofore been added to the mixture, which is to be kneaded, in proportions falling within a specific range. Such techniques for making magnetic recording media are disclosed in, for example, Japanese Unexamined Patent Publication Nos. 49(1974)-14537, 53(1978)-76012, 55(1980)-25406, and 58(1983)-200423.

As one of techniques for kneading a mixture under a shearing force higher than in conventional techniques, it has heretofore been known to minimize the amount of a solvent contained in the kneaded mixture. Specifically, with the known technique, such that a high shearing force may be obtained during the kneading process, it is necessary for the viscosity of the kneaded mixture to be kept as high as possible. However, in cases where the amount of the solvent contained in the kneaded mixture is kept as small as possible during the kneading process, it often occurs that the kneading process cannot be carried out appropriately or becomes impossible, depending on fluctuations in external factors, such as the temperature and humidity, and fluctuations in raw materials, particularly fluctuations in physical properties, for example, the water content, bulk density and specific surface area of the ferromagnetic grains.

It has also been proposed to treat ferromagnetic grains with dispersing agents and then to subject the treated ferromagnetic grains to kneading processes. Such techniques are disclosed in, for example, Japanese Unexamined Patent Publication Nos. 53(1978)-76012 and 62(1987)-41274.

However, in order for ferromagnetic grains to be treated with dispersing agents or surface treating agents, filtered, and dried before being subjected to kneading processes, additional apparatuses must be used. Also, considerable time and expenses are required for the treating, filtering, and drying processes to be carried out. Additionally, solvents are used in the course of treating the surfaces of the ferromagnetic grains with dispersing agents. Therefore, the solvents come into contact with the ferromagnetic grains, and condensates, oxides, or the like, of the solvents are thereby caused to occur. The condensates, oxides, or the like, of the solvents are entrained into magnetic coating compositions, and consequently into magnetic layers constituted of the magnetic coating compositions. The condensates, oxides, or the like, of the solvents cause the magnetic layers to become plasticized and less durable. Moreover, the ferromagnetic grains come into contact with a small amount of oxygen in the course of being subjected to treatment, such as dipping in the solvents and drying of the solvents. Therefore, in cases where the ferromagnetic grains are ferromagnetic metal grains, problems also occur in that the magnetic properties of the ferromagnetic metal grains become poor during such treatment.

The inventors carried out research of how to treat ferromagnetic grains and found that, if ferromagnetic grains and a surface treating agent are mixed and ground without any solvent being used, processes can be simplified, dispersing qualities of the ferromagnetic grains in a magnetic layer can be kept good, and durability of the magnetic layer can be kept high. The present invention is based on such findings.

SUMMARY OF THE INVENTION

The primary object of the present invention is to provide a method for making a magnetic recording medium wherein surface treatment and kneading of ferromagnetic grains are carried out appropriately, and a magnetic recording medium exhibiting good dispersing qualities of the ferromagnetic grains and a high durability is obtained.

Another object of the present invention is to provide a method for making a magnetic recording medium, which enables a magnetic recording medium exhibiting excellent electromagnetic transducing characteristics to be made.

The present invention provides a method for making a magnetic recording medium, which comprises the steps of:

i) mixing ferromagnetic grains and a surface treating agent, grinding the resulting mixture, and thus obtaining a ground mixture, ii) adding a binder and a solvent to the ground mixture, which results from the mixing and grinding process, kneading the resulting mixture, thereafter diluting it, and thus obtaining a kneaded and diluted mixture, iii) adding an additive and a solvent to the kneaded and diluted mixture, which results from the kneading and diluting process, carrying out a dispersion process on the resulting mixture, and thus obtaining a dispersion mixture, and iv) thereafter applying the dispersion mixture, which results from the dispersion process, to a non-magnetic substrate.

In the method for making a magnetic recording medium in accordance with the present invention, the kneading and diluting process should preferably be carried out such that a polar group-containing binder and a solvent are added to the ground mixture, which results from the mixing and grinding process, the resulting mixture is kneaded, thereafter a binder and a solvent are added even further to the mixture, which has thus been kneaded, and a dilution kneading process is carried out on the mixture thus obtained.

With the method for making a magnetic recording medium in accordance with the present invention, ferromagnetic grains and a surface treating agent are mixed together and ground without any solvent being used, and a ground mixture is thereby obtained. Therefore, there is no risk that condensates, oxides, or the like, of a solvent will be generated in the ground mixture. Also, ferromagnetic grains can be ground under a high shearing force, and the ground mixture can be obtained in which the surfaces of ferromagnetic grains have been treated uniformly. Thereafter, a binder and a solvent are added to the ground mixture, which results from the mixing and grinding process, the resulting mixture is kneaded and diluted, and a kneaded and diluted mixture is thereby obtained. In this manner, the ground mixture, which results from the mixing and grinding process, can be uniformly mixed with the binder and the solvent. Also, because the surfaces of the ferromagnetic grains have already been treated, condensates, oxides, or the like, of the solvent do not occur when the solvent comes into contact with the ferromagnetic grains. Therefore, the problem does not occur in that condensates, oxides, or the like, of the solvent are included in the dispersion mixture, which is applied to the non-magnetic substrate in order to form a magnetic layer thereon, and cause the resulting magnetic layer to become plasticized and less durable.

Also, with the method for making a magnetic recording medium in accordance with the present invention, the kneading process can be carried out appropriately under a high shearing force without being adversely affected by fluctuations in external factors, such as the temperature and humidity, and fluctuations in raw materials, particularly fluctuations in physical properties, for example, the water content, bulk density and specific surface area of the ferromagnetic grains. Additionally, the time required for the kneading process to be carried out can be kept markedly short, and energy required for the kneading process to be carried out can be kept markedly small.

With the method for making a magnetic recording medium in accordance with the present invention, the dispersion mixture is obtained by carrying out the dispersion process on the kneaded and diluted mixture, which results from the kneading and diluting process. The dispersion mixture (i.e. the magnetic coating composition) thus obtained is then applied to a non-magnetic substrate of a magnetic recording medium, and a magnetic layer is thereby overlaid on the non-magnetic substrate. The magnetic recording medium, which is thus made, exhibits good dispersing qualities of the ferromagnetic grains, good surface characteristics, and a high durability. Also, the magnetic recording medium thus obtained exhibits excellent electromagnetic transducing characteristics, e.g. a high maximum magnetic flux density (Bm), a high residual magnetic flux density (Br), and a high squareness ratio (Br/Bm).

DETAILED DESCRIPTION OF THE INVENTION

The method for making a magnetic recording medium in accordance with the present invention will hereinbelow be described in more detail.

The method for making a magnetic recording medium in accordance with the present invention comprises the process for mixing and grinding ferromagnetic grains and a surface treating agent and thus obtaining a ground mixture, the process for kneading and diluting the ground mixture, which results from the mixing and grinding process, and thus obtaining a kneaded and diluted mixture, and the process for dispersing the kneaded and diluted mixture, which results from the kneading and diluting process, and thus obtaining a dispersion mixture. The dispersion mixture, which results from the dispersion process, is then applied to a non-magnetic substrate.

In the mixing and grinding process, ferromagnetic grains and a surface treating agent are mixed together and ground, and a ground mixture is thereby obtained. The mixing and grinding process is carried out with the same kneading apparatus as that used for the next kneading and diluting process. As the kneading apparatus, a roll mill, a kneader (batch type), a pressure kneader, a continuous kneading and mixing machine, or the like, may be employed. Such kneading apparatuses are described in, for example, "Konren Gijutsu" (Kneading Techniques), Kenji Hashimoro, Sangyo Gijutsu Center. In general, the mixing and grinding process is carried out in the manner described below. Specifically, 1,000 parts by weight of ferromagnetic grains are introduced into a kneading apparatus, such as a roll mill, a kneader, or a continuous kneading and mixing machine. The kneading apparatus should preferably be located in an atmosphere, which has been purged with an inert gas, such as a nitrogen gas, an argon gas, or a neon gas, and in which the concentration of oxygen is at most 4%. Thereafter, a surface treating agent is added in proportions falling within the range of 0.03 part by weight to 10 parts by weight. The ferromagnetic grains and the surface treating agent are mixed together and ground for a period of 0.1 to one hour.

In the method for making a magnetic recording medium in accordance with the present invention, as the surface treating agent, one of various coupling agents, which are capable of reacting with the surfaces of the ferromagnetic grains, may be employed. For example, the surface treating agent may be selected from the group consisting of the silane coupling agents listed in Tables 1 and 2, the titanate coupling agents listed in Table 3, the aluminum coupling agents listed in Table 4, and organic compounds having polar groups, which are capable of being strongly adsorbed by the surfaces of the ferromagnetic grains. As such organic compounds, acids, which have polar groups, such as $SO_3H$, $PO_3H_2$, $OSO_3H$, and $OPO_3H_2$, and are more strongly acidic than carboxylic acids, may be employed. Alternatively, alkali metal salts or ammonium salts of these acids may be employed as the organic compounds. The acids should preferably be free acids. Specifically, the organic compounds may be, for example, the following acidic substances:

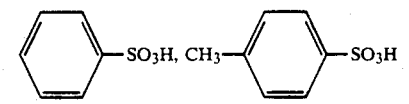

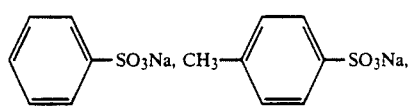

a lauryl sulfuric acid sodium salt, a dodecyl sulfuric acid sodium salt, phenyl phosphoric acid, a phenyl phosphoric acid disodium salt,

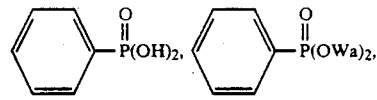

R—CONHOH, and R—SONHOH.

TABLE 1

| Silane Coupling Agents (1) | |
|---|---|
| Chemical name | Structural formula |
| Vinyltrichlorosilane | $CH_2=CHSiCl_3$ |
| Vinyl-tris(β-methoxyethoxy)silane | $CH_2=CHSi(OC_2H_4OCH_3)_3$ |
| Vinyltriethoxysilane | $CH_2=CHSi(OC_2H_5)_3$ |
| Vinyltrimethoxysilane | $CH_2=CHSi(OCH_3)_3$ |
| γ-Methacryloxypropyl trimethoxy silane | $CH_2=C(CH_3)-C(=O)-O-C_3H_6Si(OCH_3)_3$ |
| β-(3,4-Epoxycyclohexyl)ethyl trimethoxy silane | (epoxycyclohexyl)-$C_2H_4Si(OCH_3)_3$ |
| γ-Glycidoxypropyltrimethoxysilane | $CH_2\text{—}CHCH_2OC_3H_6Si(OCH_3)_3$ (epoxide O) |
| γ-Glycidoxypropylmethyldiethoxy-silane | $CH_2\text{—}CHCH_2OC_3H_6Si(CH_3)(OC_2H_5)_2$ (epoxide O) |
| N-(β-Aminoethyl)-γ-aminopropyl trimethoxy silane | $H_2NC_2H_4NHC_3H_6Si(OCH_3)_3$ |
| N-(β-Aminoethyl)-γ-aminopropyl methyl diethoxy silane | $H_2NC_2H_4NHC_3H_6Si(CH_3)(OCH_3)_2$ |
| γ-Aminopropyl triethoxy silane | $H_2NC_3H_6Si(OC_2H_5)_3$ |
| N-Phenyl-γ-aminopropyl trimethoxy silane | $C_6H_5NHC_3H_6Si(OCH_3)_3$ |
| γ-Mercaptopropyl trimethoxy silane | $HSC_3H_6Si(OCH_3)_3$ |
| γ-Chloropropyl trimethoxy silane | $ClC_3H_6Si(OCH_3)_3$ |

TABLE 2

| Silane Coupling Agents (2) | |
|---|---|
| Chemical name | Structural formula |
| Methyltrichlorosilane | $CH_3SiCl_3$ |
| Methyldichlorosilane | $(CH_3)HSiCl_2$ |
| Dimethyldichlorosilane | $(CH_3)_2SiCl_2$ |
| Trimethyldichlorosilane | $(CH_3)_3SiCl$ |
| Phenyltrichlorosilane | $C_6H_5SiCl_3$ |
| Diphenyldichlorosilane | $(C_6H_5)_2SiCl_2$ |
| Tetramethoxysilane | $Si(OCH_3)_4$ |
| Methyltrimethoxysilane | $CH_3Si(OCH_3)_3$ |
| Dimethyldimethoxysilane | $(CH_3)_2Si(OCH_2)_2$ |
| Phenyltrimethoxysilane | $C_6H_5Si(OCH_3)_3$ |

TABLE 2-continued

Silane Coupling Agents (2)

| Chemical name | Structural formula |
|---|---|
| Diphenyldimethoxysilane | $(C_6H_5)_2Si(OCH_3)_2$ |
| Tetraethoxysilane | $Si(OC_2H_5)_4$ |
| Methyltriethoxysilane | $CH_3Si(OC_2H_5)_3$ |
| Dimethyldiethoxysilane | $(CH_3)_2Si(OC_2H_5)_2$ |
| Phenyltriethoxysilane | $C_6H_5Si(OC_2H_5)_3$ |
| Diphenyldiethoxysilane | $(C_6H_5)_2Si(OC_2H_5)_2$ |
| Hexamethyldisilazine | $(CH_3)_2SiNHSi(CH_3)_3$ |
| N,O-Bis(trimethylsilyl)acetamide | $CH_3C(=NSi(CH_3)_3)(OSi(CH_3)_3)$ |
| N,N-Bis(trimethylsilyl)urea | $[(CH_3)_3SiNH]_2CO$ |
| Tert-butyldimethylchlorosilane | $tert\text{-}Bu(CH_3)_2SiCl$ |

TABLE 3

Titanate Coupling Agents

| Chemical name | Structural formula |
|---|---|
| Isopropyltriisostearoyltitanate | $CH_3-CH(CH_3)-O-Ti[-O-C(=O)-C_{17}H_{35}]_3$ |
| Isopropyltrioctanoyltitanate | $CH_3-CH(CH_3)-O-Ti[-O-C(=O)-C_7H_{15}]_3$ |
| Isopropyldimethacrylisostearoyltitanate | $CH_3-CH(CH_3)-O-Ti(O-C(=O)-C_{17}H_{35})[O-C(=O)-C(CH_3)=CH_2]_2$ |
| Isopropyltridodecylbenzenesulfonyltitanate | $CH_3-CH(CH_3)-O-Ti[-O-SO_2-C_6H_4-C_{12}H_{25}]_3$ |
| Isopropylisostearoyldiacryltitanate | $CH_3-CH(CH_3)-O-Ti(O-C(=O)-C_{17}H_{35})[O-C(=O)-C(CH_3)=CH_2]_2$ |
| Isopropyltri(dioctylphosphate)titanate | $CH_3-CH(CH_3)-O-Ti[-O-P(=O)(O-C_8H_{17})_2]_3$ |
| Isopropyltricumylphenyltitanate | $CH_3-CH(CH_3)-O-Ti[-O-C_6H_4-C(CH_3)_2-C_6H_5]_3$ |
| Isopropyltris(dioctylpyrophosphate)titanate | $CH_3-CH(CH_3)-O-Ti[-O-P(=O)(OH)-O-P(=O)(O-C_8H_{17})_2]_3$ |
| Isopropyltri(n-aminoethyl-aminoethyl)titanate | $CH_3-CH(CH_3)-O-Ti[-OC_2H_4-NH-C_2H_4-NH_2]_3$ |
| Tetraisopropylbis(dioctylphosphite)titanate | $[CH_3-CH(CH_3)-O-]_4Ti.[P(-O-C_8H_{17})_2OH]_2$ |
| Tetraoctylbis(ditridecylphosphite)titanate | $(C_8H_{17}-O)_4Ti.[P(O-C_{13}H_{27})_2OH]_2$ |
| Tetra(2,2-diallyloxymethyl-1-butyl)bis(ditridecyl)phosphitetitanate | $[C_2H_5-C(CH_2O-)(-(CH_2-O-CH_2-CH=CH_2)_2)]_4 \text{—Ti}[P(O.C_{13}H_{27})_2OH]_2$ |

TABLE 3-continued

| Titanate Coupling Agents | |
|---|---|
| Chemical name | Structural formula |
| Dicumylphenyloxyacetatetitanate | $\begin{array}{c}O\\\parallel\\C-O-Ti\\|\\CH_2-O\end{array}\left[O-\underset{}{\bigcirc}-\underset{CH_3}{\overset{CH_3}{\underset{|}{C}}}-\bigcirc\right]_3$ |
| Bis(dioctylpyrophosphate)oxyacetatetitanate | $\begin{array}{c}O\\\parallel\\C-O-Ti\\|\\CH_2-O\end{array}\left[O-\overset{O}{\underset{\parallel}{P}}-O-\overset{O}{\underset{\parallel}{P}}(O-C_8H_{17})_2\right]_2$ |
| | $OH$ |
| Diisostearoylethylenetitanate | $\begin{array}{c}CH_2-O\\|\\CH_2-O\end{array}Ti[O-\overset{O}{\underset{\parallel}{C}}-C_{17}H_{35}]_2$ |
| Bis(dioctylpyrophosphate)ethylenetitanate | $\begin{array}{c}CH_2-O\\|\\CH_2-O\end{array}Ti\left[O-\overset{O}{\underset{\parallel}{P}}-O-\overset{O}{\underset{\parallel}{P}}(O-C_8H_{17})_2\right]_2$ |
| | $OH$ |

TABLE 4

| Aluminum Coupling Agent | |
|---|---|
| Chemical name | Structural formula |
| Acetoalkoxy aluminum diisopropylate | $\begin{array}{c}CH_3\\|\\CH_3-CH-O\\\\CH_3\\|\\CH_3-CH-O\end{array}Al\begin{array}{c}O-C-CH_3\\\\\parallel\\CH\\/\\O=C-OR\end{array}$ |

In the method for making a magnetic recording medium in accordance with the present invention, the ferromagnetic grains may be selected from the group consisting of ferromagnetic iron oxide grains constituted of a material, such as $\gamma\text{-}Fe_2O_3$, $Fe_3O_4$, a solid solution of t a different metal, e.g. Co or Zn, in $\gamma\text{-}Fe_2O_3$ or $Fe_3O_4$; ferromagnetic chromium dioxide grains constituted of a material, such as $CrO_2$, or a solid solution of a different metal, e.g. Li, Na, Sn, Pb, Fe, Co, Ni, or Zn, in $CrO_2$; and ferromagnetic metal grains constituted of a metal, such as Co, Fe, or Ni, or an alloy of such metals. The ferromagnetic metal grains are advantageous in that the saturation magnetization ($\sigma S$) and the coercive force (Hc) are high, and a magnetic recording medium can be obtained which exhibits a high signal-to-noise ratio (S/N ratio) on which information can be recorded at high densities.

No limitation is imposed on how the ferromagnetic metal grains are prepared. By way of example, the ferromagnetic metal grains may be prepared by reducing an acicular oxyhydroxide, which may or may not contain a different metal, or an acicular iron oxide obtained from such an oxyhydroxide. In order for the chemical stability of the ferromagnetic grains to be kept good, oxide layers should preferably be overlaid on the surfaces of the ferromagnetic grains. Such oxide layers may be formed by dipping the ferromagnetic grains in an organic solvent and gradually oxidizing the surfaces the ferromagnetic grains with a gas, which contains oxygen. Alternatively, the oxide layers may be formed by locating the ferromagnetic grains in an inert gas, gradually increasing the partial pressure of oxygen in the inert gas, and thereby gradually oxidizing the surfaces of the ferromagnetic grains.

The ferromagnetic grains should preferably be as fine as possible. Specifically, the value of the specific surface area, as measured with the BET method, which value is employed to indicate the sizes of the ferromagnetic grains, should preferably be at least 40 $m^2/g$ for ferromagnetic oxide grains and at least 50 $m^2/g$ for ferromagnetic metal grains.

The kneading and diluting process for adding a binder and a solvent to the ground mixture, which results from the mixing and grinding process, kneading the resulting mixture, thereafter diluting it, and thus obtaining a kneaded and diluted mixture may be carried out in the manner described below. Specifically, 30 to 100 parts by weight of a solution, which contains 5 to 35 wt % of a binder in an organic solvent, are added to the ground mixture, which results from the mixing and grinding process. In the aforesaid kneading apparatus, the resulting mixture is kneaded under a shearing stress falling within the range of 10 $kg/cm^2$ to 400 $kg/cm^2$, and preferably within the range of 20 $kg/cm^2$ to 300 $kg/cm^2$. Ordinarily, the kneading process is carried out until the mixture, which is being kneaded, changes from a grain state to a continuous mass state. Thereafter, 200 to 400 parts by weight of a solution, which contains 1 to 10 parts by weight of a binder in an organic solvent, are added little by little to the mixture, which is being kneaded. The resulting mixture is kneaded even further and is thus diluted.

The binder used in the method for making a magnetic recording medium in accordance with the present invention may be selected from the group consisting of a conventional thermoplastic resin, a conventional thermosetting resin, a conventional reactive resin, and a mixture of two or more of these resins.

The thermoplastic resin may be, for example, a polymer of a monomer, such as vinyl chloride, vinylidene chloride, vinyl fluoride, vinylidene fluoride, vinyl acetate, a (meth)acrylic ester, (meth)acrylonitrile, (meth)a- crylamide, butadiene, styrene, or a derivative of one of these compounds; a copolymer of two or more of the above-enumerated monomers; a copolymer of one of the above-enumerated monomers and a monomer capable of undergoing radical polymerization; a condensation polymer, such as a polyurethane, a polyester, a polyamide; an epoxy resin; or a cellulose derivative, such as cellulose propionate, cellulose acetate butyrate, cellulose diacetate, cellulose triacetate, or nitrocellulose.

In order that the interaction between the thermoplastic resin and the ferromagnetic grains and the dispersibility of the ferromagnetic grains may be kept high, the thermoplastic resin should preferably be incorporated with a polar group exhibiting a high affinity for the ferromagnetic grains. The polar group may be, for example, a COOM group, an $SO_3M$ group, an $OSO_3M$ group, a $PO_3M_2$ group, or an $OPO_3M_2$ group, where M represents H, an alkali metal, such as Na or K, or an ammonium ion. The polar group can be incorporated into the thermoplastic resin by copolymerizing a monomer, which contains the polar group, and the monomer for the thermoplastic resin, or by utilizing a polymer reaction.

The thermosetting resin or the reactive resin is constituted of a compound, which undergoes a condensation reaction or an addition reaction and whose molecular weight increases infinitely when being heated or exposed to light or a radiation. By way of example, the thermosetting resin or the reactive resin is selected from the group consisting of an epoxy resin, a curable polyurethane resin, and an unsaturated resin containing a double bond.

A polyisocyanate compound may be added as a cross-linking agent to the binder in order to improve the durability of the magnetic recording medium.

The resins for the binder may be used alone or in combination. The binder is used in proportions falling within the range of 8 to 30 parts by weight per 100 parts by weight of the ferromagnetic grains, and preferably within the range of 15 to 25 parts by weight per 100 parts by weight of the ferromagnetic grains.

The solvent used in the method for making a magnetic recording medium in accordance with the present invention may be an organic solvent selected from the group consisting of a ketone, such as methyl ethyl ketone or cyclohexanone; an alcohol, such as ethanol; an ester, such as ethyl acetate or butyl acetate; a Cellosolve; an ether; an aromatic solvent, such as toluene; and a halogenated hydrocarbon solvent, such as chloroform or carbon tetrachloride.

The dispersion process for adding an additive, such as a filler or a lubricant, and a solvent to the kneaded and diluted mixture, which results from the kneading and diluting process, carrying out a dispersing operation on the resulting mixture, and thus obtaining a dispersion mixture, may be carried out in the manner described below. Specifically, 5 to 20 parts by weight of abrasive grains and 1 to 20 parts by weight of carbon black are added as fillers to 500 parts by weight of the kneaded and diluted mixture, which results from the kneading and diluting process. The resulting mixture is then subjected to a dispersing operation for a period falling within the range of 1 to 48 hours in a dispersing machine, such as a sand mill, a disperser, a high-speed impeller dispersing machine, an ultrasonic dispersing machine, or an in-line mixer. Thereafter, 5 to 50 parts by weight of a curing agent and 1 to 10 parts by weight of a lubricant are added to the mixture, which is being dispersed. A high-speed shearing and dispersing operation is carried out on the resulting mixture for a period falling within the range of 0.1 to 5 hours, and a magnetic coating composition is thereby obtained.

The filler may be, for example, abrasive grains having a Mohs hardness of at least 6, or an antistatic agent. The antistatic agent may be constituted of an electrically conductive material, such as carbon black.

The abrasive grains may be selected from the group consisting of an oxide, such as an aluminum oxide ($\alpha$-$Al_2O_3$, $\gamma$-$Al_2O_3$, or the like), chromium oxide ($Cr_2O_3$), titanium oxide ($TiO_2$), silicon oxide ($SiO_2$), or iron oxide ($\alpha$-$Fe_2O_3$); a carbide, such as silicon carbide (SiC) or titanium carbide (TiC); a nitride, such as boron nitride; and diamond. The mean grain diameter of the abrasive grains should fall within the range of 0.01 $\mu$m to 0.5 $\mu$m.

The antistatic agent may be, for example, electrically conductive grains, which may be constituted of carbon black, graphite, or the like.

The filler is used in proportions falling within the range of 2 to 20 parts by weight per 100 parts by weight of the ferromagnetic grains, and preferably within the range of 5 to 15 parts by weight per 100 parts by weight of the ferromagnetic grains.

As the antistatic agent, a nonionic surface active agent, an anionic surface active agent, or a cationic surface active agent may also be used.

The lubricant may be selected from the group consisting of a silicone oil, such as polysiloxane; a fatty acid having 10 to 22 carbon atoms; a fatty acid ester; and a surface active agent. These compounds may be used alone or in combination. The lubricant is used in proportions falling within the range of 0.1 to 30 parts by weight with respect to the amount of the binder.

In order for the pot life of the magnetic coating composition to be kept long, the curing agent should preferably be added immediately before the magnetic coating composition is applied to the non-magnetic substrate. As the curing agent, an ordinary aliphatic or aromatic polyisocyanate may be employed.

After being prepared in the manner described above, the dispersion mixture (the magnetic coating composition) is applied to the non-magnetic substrate.

The non-magnetic substrate employed in the method for making a magnetic recording medium in accordance with the present invention may be constituted of, for example, a synthetic resin, such as a polyester, a polyamide, a polyolefin, or a cellulose derivative; a non-magnetic metal; a glass; a ceramic material; or a paper. The non-magnetic substrate may have a film-, tape-, sheet-, card-, disk-, or drum-like shape.

The magnetic coating composition, which has been prepared in the manner described above, may be applied to the non-magnetic substrate with one of various processes, such as air doctor coating, blade coating, air knife coating, and gravure coating. Such processes are described in "Coating Kogaku" (Coating Engineering), 1971, Asakura Shoten. Before the magnetic coating composition is applied to the non-magnetic substrate, an intermediate layer may be overlaid on the non-magnetic substrate such that, for example, the adhesion strength of a magnetic layer to the non-magnetic substrate may be kept high and electric conductivity may be imparted to the non-magnetic substrate. Also, a backing layer may be overlaid on the back surface of the non-magnetic substrate such that the non-magnetic substrate can travel smoothly when being used to record or reproduce information.

When necessary, before being dried, the magnetic layer, which has been overlaid on the non-magnetic substrate, may be subjected to a process for orientating the ferromagnetic grains in the magnetic layer. The thickness of the magnetic layer falls within the range of 1 μm to 6 μm, depending on the recording system in which the magnetic recording medium is used, and should preferably fall within the range of 2 μm to 4 μm.

Also, in order for the electromagnetic transducing characteristics to be kept good, the magnetic recording medium should preferably be subjected to a process for smoothing the surface of the magnetic layer. Specifically, the magnetic layer should preferably be subjected to a smoothing process before being dried or to a calendering process after being dried.

The present invention will further be illustrated by the following nonlimitative examples, wherein parts represent parts by weight unless otherwise specified.

EXAMPLE 1

Ferromagnetic metal grains were prepared by reducing iron oxyhydroxide grains, which had been doped with an Al type of a sinter preventing agent, locating the reduced grains in an inert gas, gradually increasing the concentration of oxygen in the inert gas, and thereby forming oxide layers for stabilization on the surfaces of the grains. The ferromagnetic metal grains contained Fe as their main constituent. The ferromagnetic metal grains also contained small amounts of Ni, Cr, and Zn. The ferromagnetic metal grains has the characteristics such that the mean length of longer axis was 0.2 μm, the acicular ratio was approximately 10, the specific surface area as measured with the BET method was 55 m$^2$/g, the crystallite size was approximately 200 Å, the saturation magnetization ($\sigma$S) was 125 emu/g, and the coercive force (Hc) was 1,580 Oe. Thereafter, 1,000 parts of the ferromagnetic metal grains were introduced into a kneader located in an atmosphere, which had been purged with a nitrogen gas and in which the concentration of oxygen was 1%. Then, 30 parts of phenylphosphonic acid was added to the ferromagnetic metal grains. The ferromagnetic metal grains and phenylphosphonic acid were mixed and ground for a period of 10 minutes in the kneader, and a ground mixture was thereby obtained.

Thereafter, 500 parts of a solution, which contained 120 parts of SO$_3$Na group-containing vinyl chloride resin (polymerization degree: approximately 300, SO$_3$Na group contents: 7×10$^{-5}$ eq/g, OH group contents: 30×10$^{-5}$ eq/g, epoxy group contents: 70×10$^{-5}$ eq/g) in 380 parts of cyclohexanone, were added to the ground mixture, which was obtained in the manner described above. The resulting mixture was kneaded under a shearing stress falling within the range of 40 kg/cm$^2$ to 150 kg/cm$^2$ in the kneader. The kneading process was carried out until the mixture, which was being kneaded, changed from a grain state to a continuous mass state, and a kneaded mixture was thereby obtained.

Thereafter, 1,000 parts of a solution, which contained 60 parts of a polyester polyurethane resin (weight-average molecular weight: approximately 60,000, SO$_3$Na group contents: 6×10$^{-5}$ eq/g, glass transition temperature: 20° C.) in methyl ethyl ketone (MEK) and toluene (the ratio of the amount of MEK to the amount of toluene was 1:1), were added little by little to the kneaded mixture, which was obtained in the manner described above. Thereafter, 500 parts of MEK were even further added little by little. In this manner, the resulting mixture were kneaded and diluted, and a kneaded and diluted mixture was thereby obtained.

A dispersing operation was then carried out on a mixture of 500 parts of the kneaded and diluted mixture, which was prepared in the manner described above, 15 parts of α-alumina having a mean grain diameter of 0.2 μm, and 1.5 parts of carbon black having a mean grain diameter of 0.03 μm in a sand mill. Thereafter, 12 parts of a polyisocyanate (Desmodule L-75 supplied by Bayer K.K.), 2 parts of stearic acid, and 2 parts of butyl stearate were added to the mixture, which had thus been dispersed. The resulting mixture was subjected to a high-speed shearing and dispersing operation, and a magnetic coating composition was thereby prepared.

Thereafter, the magnetic coating composition prepared in the manner described above was applied to a 10 μm-thick polyester film at such a rate that a magnetic layer having a thickness of 3.5 μm in its dry state was formed on the polyester film. The ferromagnetic metal grains in the magnetic layer were then orientated, and then the magnetic layer was dried. In this manner, a magnetic recording medium web was made. The magnetic recording medium web was then subjected to a calendering process at a temperature of 85° C. and a heat treatment for a period of 24 hours. Thereafter, the magnetic recording medium web was slit to 8 mm-wide pieces. In this manner, samples of 8 mm video tapes were prepared.

EXAMPLES 2, 3, and 4

Samples of 8 mm video tapes were prepared in the same manner as that in Example 1, except that a different surface treating agent and a different kneading period were employed as shown in Table 5.

COMPARATIVE EXAMPLE 1

Samples of 8 mm video tapes were prepared in the same manner as that in Example 1, except that no phenylphosphonic acid was used.

COMPARATIVE EXAMPLE 2

After 1,000 parts of the same ferromagnetic metal grains as those in Example 1 were immersed in 3,000 parts of toluene, 30 parts of phenylphosphonic acid were added to the resulting mixture. The mixture thus obtained was then stirred at room temperature for a period of 10 hours. The ferromagnetic metal grains were then taken up by filtration, and dried in a nitrogen atmosphere. An analysis of the toluene phase revealed that no phenylphosphonic acid remained in the toluene phase, but all phenylphosphonic acid was adhered to the surfaces of the ferromagnetic metal grains. The ferromagnetic metal grains, whose surfaces had thus been treated with phenylphosphonic acid, were then processed in the same manner as that in Comparative Example 1, and samples of 8 mm video tapes were thus prepared.

COMPARATIVE EXAMPLES 3, 4, and 5

Three different types of samples of 8 mm video tapes were prepared in the same manner as that in Comparative Example 2, except that instead of phenylphosphonic acid being used, diphenyldiethoxysilane, isopropyltrioctanoyltitanate, or ethyl acetoacetate aluminum diisopropionate was used as the surface treating agent, and the kneading period was changed as shown in Table 5.

As for the samples obtained in Examples 1 through 4 and Comparative Examples 1 through 5, the following characteristics were measured. The results of the measurements are shown in Table 5.

1) Kneading period:

The kneading period required for the mixture, which is being kneaded, to change from a grain state to a continuous mass state was measured. The kneading period was expressed as a relative value with respect to the kneading period required in Comparative Example 1, which was taken as 100.

2) Surface gloss:

The surface gloss was measured from a direction inclined by 45 degrees from the line, which was normal to the surface of a tape. The surface gloss was expressed as a relative value with respect to the surface gloss of the sample obtained in Comparative Example 1, which was taken as 100%.

3) Squareness ratio

The Br/Bm value (i.e. the value of residual magnetic flux density / saturated magnetic flux density) at a maximum magnetic flux intensity of 5 kOe was measured by use of a vibrating sample magnetic flux meter (Toei Kogyo K.K.).

4) Reproduction output power:

The output power was measured at a recording wavelength of 4MHz and expressed as a relative value with respect to the output power of the sample obtained in Comparative Example 1, which was taken as 0 dB. (VTR*Fuji D-100)

5) YS/N, 6CS/N:

The YS/N and 6CS/N values were expressed as S/N values obtained when a Y or C signal was measured with a noise meter. (VTR*Fuji D-100)

nitrogen gas, in accordance with a process described in Japanese Unexamined Patent Publication No. 64(1989)-79274, 64(1989)-79275, or 1(1989)-106338.

Specifically, 1,000 parts of the same ferromagnetic metal grains as those in Example 1 and 30 parts of phenylphosphonic acid were mixed together. Also, 500 parts of a solution, which contained 120 parts of $SO_3Na$ group-containing vinyl chloride resin (polymerization degree: approximately 300, $SO_3Na$ group contents: $7 \times 10^{-5}$ eq/g, OH group contents: $30 \times 10^{-5}$ eq/g, epoxy group contents: $70 \times 10^{-5}$ eq/g) in 380 parts of cyclohexanone, were added to the resulting mixture in a first continuous kneading and mixing machine (KRC Kneader T-4, Kurimoto, Ltd.) located in an atmosphere, which had been purged with a nitrogen gas and in which the concentration of oxygen was at most 1%. The resulting mixture was then kneaded in the first continuous kneading and mixing machine, and a kneaded mixture in a mass state was continuously obtained therefrom.

The kneaded mixture thus obtained continuously was introduced into a second continuous kneading and mixing machine (KRC Kneader T-4, Kurimoto, Ltd.), which was connected to the outlet part of the first continuous kneading and mixing machine. Thereafter, 1,000 parts of a solution, which contained 60 parts of a polyester polyurethane resin (weight-average molecular weight: approximately 60,000, $SO_3Na$ group contents: $6 \times 10^{-5}$ eq/g, glass transition temperature: 20° C.) in methyl ethyl ketone (MEK) and toluene (the ratio of the amount of MEK to the amount of toluene was 1:1), were continuously fed into the second continuous kneading and mixing machine from its four dilution openings. In this manner, the kneaded mixture, which was obtained in the manner described above, was diluted. Thereafter, 500 parts of MEK were even further added to the mixture, which was thus diluted and continuously fed out of the outlet of the second continuous kneading and mixing machine. The resulting mixture were thus diluted in a dissolver, and a kneaded and diluted mixture was thereby obtained.

TABLE 5

| | | Surface treatment | | | | Results of measurements | | | |
|---|---|---|---|---|---|---|---|---|---|
| Sample | Surface treating agent | Treatment with a solvent | Filtration | Drying | Kneading period (Relative) | Bm (G) | Squareness ratio | Gloss (Relative) | Reproduction output power (dB) |
| Ex. 1 | Phenylphosphonic acid | Not carried out | Not carried out | Not carried out | 20 | 3100 | 0.89 | 110 | 0.9 |
| 2 | Diphenyldiethoxysilane | Not carried out | Not carried out | Not carried out | 20 | 3050 | 0.87 | 107 | 0.8 |
| 3 | Isopropyltrioctanoyltitanate | Not carried out | Not carried out | Not carried out | 25 | 3070 | 0.86 | 106 | 0.7 |
| 4 | Ethyl acetoacetate aluminum diisopropionate | Not carried out | Not carried out | Not carried out | 25 | 3060 | 0.87 | 108 | 0.8 |
| Comp. Ex. 1 | None | — | — | — | 100 | 2800 | 0.83 | 100 | 0.0 |
| 2 | Phenylphosphonic acid | Carried out | Carried out | Carried out | 20 | 3000 | 0.88 | 108 | 0.5 |
| 3 | Diphenyldiethoxysilane | Carried out | Carried out | Carried out | 22 | 2900 | 0.87 | 105 | 0.4 |
| 4 | Isopropyltrioctanoyltitanate | Carried out | Carried out | Carried out | 30 | 2950 | 0.86 | 105 | 0.3 |
| 5 | Ethyl acetoacetate aluminum diisopropionate | Carried out | Carried out | Carried out | 26 | 2980 | 0.86 | 106 | 0.4 |

Rating was carried out in the same manner as that described above also for samples obtained in Examples 5 and 6 and Comparative Examples 6, 7, and 8.

EXAMPLE 5

Instead of the process in Example 1 being carried out, samples were prepared by using a continuous kneading and mixing machine, which had been purged with a A dispersing operation was then carried out on a mixture of 500 parts of the kneaded and diluted mixture, which was prepared in the manner described above, 15 parts of α-alumina having a mean grain diameter of 0.2 μm, and 1.5 parts of carbon black having a mean grain diameter of 0.03 μm in a sand mill. Thereafter, 12 parts of a polyisocyanate (Desmodule L-75 supplied by Bayer K.K.), 2 parts of stearic acid, and 2 parts of butyl stearate were added to the mixture, which had thus been dispersed. The resulting mixture was subjected to a high-speed shearing and dispersing operation, and a magnetic coating composition was thereby prepared.

Thereafter, the magnetic coating composition prepared in the manner described above was applied to a 10 μm-thick polyester film at such a rate that a magnetic layer having a thickness of 3.5 μm in its dry state was formed on the polyester film. The ferromagnetic metal grains in the magnetic layer were then orientated, and then the magnetic layer was dried. In this manner, a magnetic recording medium web was made. The magnetic recording medium web was then subjected to a calendering process at a temperature of 85° C. and a heat treatment for a period of 24 hours. Thereafter, the magnetic recording medium web was slit to 8 mm-wide pieces. In this manner, samples of 8 mm video tapes were prepared.

EXAMPLE 6

Samples of 8 mm video tapes were prepared in the same manner as that in Example 5, except that diphenyldiethoxysilane was used as the surface treating agent.

COMPARATIVE EXAMPLE 6

Samples of 8 mm video tapes were prepared in the same manner as that in Example 5, except that no phenylphosphonic acid was used.

COMPARATIVE EXAMPLE 7

After 1,000 parts of the same ferromagnetic metal grains as those in Example 1 were immersed in 3,000 parts of toluene, 30 parts of phenylphosphonic acid were added to the resulting mixture. The mixture thus obtained was then stirred at room temperature for a period of 10 hours. The ferromagnetic metal grains were then taken up by filtration, and dried in a nitrogen atmosphere. An analysis of the toluene phase revealed that no phenylphosphonic acid remained in the toluene phase, but all phenylphosphonic acid was adhered to the surfaces of the ferromagnetic metal grains. The ferromagnetic metal grains, whose surfaces had thus been treated with phenylphosphonic acid, were then processed in the same manner as that in Comparative Example 6, and samples of 8 mm video tapes were thus prepared.

COMPARATIVE EXAMPLE 8

Samples of 8 mm video tapes were prepared in the same manner as that in Comparative Example 7, except that diphenyldiethoxysilane was used as the surface treating agent.

As for the samples obtained in Examples 5 and 6 and Comparative Examples 6, 7, and 8, the characteristics described above were measured. The results of the measurements are shown in Table 6. In Table 6, instead of the kneading period in Table 5, a kneading rate is shown.

Kneading rate:
The maximum feed rate, which was required for a kneaded mixture in a mass state to be obtained continuously, was measured as the kneading rate. The kneading rate was expressed as a relative value with respect to the kneading rate in Comparative Example 6, which was taken as 100.

TABLE 6

| Sample | | Surface treating agent | Surface treatment | | | Kneading rate (Relative) | Results of measurements | | | |
|---|---|---|---|---|---|---|---|---|---|---|
| | | | Treatment with a solvent | Filtration | Drying | | Bm (G) | Squareness ratio | Gloss (Relative) | Reproduction output power (dB) |
| Ex. | 5 | Phenylphosphonic acid | Not carried out | Not carried out | Not carried out | 200 | 3150 | 0.88 | 120 | 1.0 |
| | 6 | Diphenyldiethoxysilane | Not carried out | Not carried out | Not carried out | 150 | 3120 | 0.86 | 115 | 0.9 |
| Comp. Ex. | 6 | None | — | — | — | 100 | 2850 | 0.82 | 105 | 0.2 |
| | 7 | Phenylphosphonic acid | Carried out | Carried out | Carried out | 180 | 3000 | 0.87 | 115 | 0.6 |
| | 8 | Diphenyldiethoxysilane | Carried out | " | Carried out | 152 | 2950 | 0.85 | 114 | 0.5 |

As will be clear from Tables 5 and 6, with the method for making a magnetic recording medium in accordance with the present invention, the same effects as those obtained with pre-treated ferromagnetic grains can be obtained. Also, the method for making a magnetic recording medium in accordance with the present invention is free of the problem in that magnetic properties are caused to deteriorate by pre-treatment of the ferromagnetic grains. Therefore, a magnetic recording medium can be obtained which exhibits a high saturated magnetic flux density (Bm) and a high reproduction output power.

We claim:
1. A method for making a magnetic recording medium, which comprises the steps of:
   i) mixing ferromagnetic grains and a surface treating agent, grinding the resulting mixture, and thus obtaining a ground mixture,
   ii) adding a binder and a solvent to the ground mixture, which results from the mixing and grinding process, kneading the resulting mixture, thereafter diluting it, and thus obtaining a kneaded and diluted mixture,
   iii) adding an additive and a solvent to the kneaded and diluted mixture, which results from the kneading and diluting process, carrying out a dispersion process on the resulting mixture, and thus obtaining a dispersion mixture, and iv) thereafter applying the dispersion mixture, which results from the dispersion process, to a non-magnetic substrate.

2. A method as defined in claim 1 wherein the kneading and diluting process is carried out such that a polar group-containing binder and a solvent are added to the ground mixture, which results from the mixing and grinding process, the resulting mixture is kneaded, thereafter a binder and a solvent are added even further to the mixture, which has thus been kneaded, and a dilution kneading process is carried out on the mixture thus obtained.

3. A method as defined in claim 2 wherein the polar group in the polar group-containing binder is a COOM group, an $SO_3M$ group, an $OSO_3M$ group, a $PO_3M_2$ group, or an $OPO_3M_2$ group, where M represents H, an alkali metal, or an ammonium ion.

4. A method as defined in claim 1 wherein the surface treating agent is selected from the group consisting of a silane coupling agent, a titanate coupling agent, an aluminum coupling agent, and an organic compound having a polar group, which is capable of being strongly adsorbed by the surfaces of the ferromagnetic grains.

5. A method as defined in claim 3 wherein the organic compound is selected from the group consisting of an acid, which has an $SO_3H$ polar group, a $PO_3H_2$ polar group, an $OSO_3H$ polar group, or an $OPO_3H_2$ polar group, and which is more strongly acidic than carboxylic acids, an alkali metal salt of said acid, and an ammonium salt of said acid.

6. A method as defined in claim 1 wherein the ferromagnetic grains are ferromagnetic metal grains.

* * * * *